United States Patent [19]

Lentz

[11] Patent Number: 5,714,015
[45] Date of Patent: Feb. 3, 1998

[54] FERRITIC NITROCARBURIZATION PROCESS FOR STEEL BALLS

[75] Inventor: Paul Lentz, Oregon, Ill.

[73] Assignee: Frantz Manufacturing, Sterling, Ill.

[21] Appl. No.: 635,474

[22] Filed: Apr. 22, 1996

[51] Int. Cl.$^6$ .................. B32B 15/18; C21D 1/06
[52] U.S. Cl. .................. 148/218; 148/219; 148/906; 148/319
[58] Field of Search .................. 148/210, 219, 148/906, 319

[56] References Cited

U.S. PATENT DOCUMENTS

| | | | |
|---|---|---|---|
| 4,496,401 | 1/1985 | Dawes et al. | 148/16.5 |
| 4,596,611 | 6/1986 | Dawes et al. | 148/16.5 |
| 4,881,983 | 11/1989 | Smith et al. | 148/219 |

FOREIGN PATENT DOCUMENTS

| | | | |
|---|---|---|---|
| 404254572 | 9/1992 | Japan | 148/906 |
| 405025609 | 2/1993 | Japan | 148/906 |
| 1011580 | 12/1965 | United Kingdom . | |

OTHER PUBLICATIONS

Dawes, et al., *Nitrotec Surface Treatment Technology*, Heat Treatment of Metals, 70–76 (1985).

*Primary Examiner*—Deborah Yee
*Attorney, Agent, or Firm*—Welsh & Katz, Ltd.

[57] ABSTRACT

A nitrocarburization treatment for steel components, such as steel balls or ball bearings is disclosed. In the process, the balls are treated in a nitrocarburizing environment and then reoriented, either inside or outside of that environment to form an epsilon iron nitride layer having some thickness over the entire surface of the ball and no bare spots. The reorientation process minimizes superficial metal flow at the surface of the balls and achieves consistent corrosion resistance of at least 96 hours in salt fog tests. Further, components that are cooled in a non-oxidizing environment and then reoriented prior to being returned to the nitrocarburizing environment develop a greater porous layer depth, which provides excellent oil retention for tribological applications.

12 Claims, 1 Drawing Sheet

FERRITIC NITROCARBURIZATION PROCESS FOR STEEL BALLS

TECHNICAL FIELD

The present invention generally relates to a thermal treatment for steel components and, more specifically, to a nitrocarburization process for making corrosion resistant steel balls and ball bearings.

BACKGROUND OF THE INVENTION

It is previously known in the art to apply a gaseous surface treatment process to steel components to increase the strength, wear and corrosion resistance of those components. One such conventional nitrocarburization process is known commercially by the tradename "Nitrotec" (Lucas Industries, Birmingham, England) and is described in U.S. Pat. Nos. 4,596,611 and 4,496,401 to Dawes et al. The publication by Dawes et al., *Nitrotec Surface Treatment Technology*, Heat Treatment of Metals, 70–76 (1985) generally reviews the Nitrotec treatment process.

The Nitrotec process encompasses a wide range of nitriding atmosphere compositions, the essential feature of which is combining ammonia ($NH_3$) and an endothermic gas, as is well known in the art, at temperatures ranging from 1060° F. to 1200° F. These temperature ranges are thought to be necessary to cause the ammonia to dissociate catalytically to allow the nitrogen to diffuse into the steel component. The Nitrotec process converts the surface of the steel into a black, corrosion resistant iron oxide ($Fe_3O_4$) layer. Beneath this layer is the epsilon iron nitride ($Fe_3N$) layer, having two distinct sections. The outermost section is an oxygen rich micro porous region. The other section is a solid, nitrogen rich layer. A steel component treated by the Nitrotec process is characterized by a surface hardness in the range of 65 to 70 Rc. The typical component will survive for a minimum of 96 hours in salt fog testing.

While the above described conventional nitrocarburization treatment is ideally suited for stamped sheet metal and machined components of plain carbon, medium carbon and low alloy steels, it provides unsatisfactory corrosion resistance and strength properties when applied to steel components that have been burnished or otherwise highly finished, as for example polished steel balls or ball bearings, and which are processed such that the balls are in contact with each other. Because of the fine surface finish, it is thought that intimate contacts may occur between the balls, which cause superficial metal flow to occur at the contacting surface and prevent nitrogen diffusion at that surface. As a result, polished steel balls that have been treated using the Nitrotec process are characterized by bare spots wherein no epsilon iron nitride layer has formed because of these intimate contacts. The bare spots are thought to cause the balls to have inconsistent corrosion resistance properties, which render the balls unusable for corrosion intensive applications, requiring a minimum of 96 hours of salt fog survival.

SUMMARY OF THE PRESENT INVENTION

To overcome these deficiencies, the present invention employs a nitrocarburization treatment for steel components, such as steel balls or ball bearings. The treatment involves reorienting the balls after they have been exposed to the nitrocarburizing environment to achieve consistent hardness and corrosion resistance properties.

Reorientation of the balls as part of the nitrocarburization process prevents prolonged intimate contacts between the balls, which allows nitrogen to diffuse throughout the respective surfaces of the balls and thereby limits the effects of superficial metal flow and/or solid state diffusion. As a result of this reorientation, the desired epsilon iron nitride layer having some thickness over the entire surface of the ball and no bare spots is formed. It should be noted that re-orienting the balls multiple times or continually throughout the nitrocarburization cycle will also achieve the desired epsilon iron nitride outer structure having thickness over the entire surface of the ball. Thus, continuous or periodic reorientation of the balls in the nitrocarburizing environment via magnetic manipulation or by using a rotating retort furnace or by oscillation would successfully embody the invention claimed herein.

The balls may be made of any plain carbon, medium carbon or low carbon alloy steel, including steels with magnetic properties. The steel may be non-carburized (i.e., "soft product" wherein surface carbon concentration is equal to matrix carbon concentration) or carburized (i.e., "hard product" wherein surface carbon concentration is greater than matrix carbon concentration) prior to processing in the nitrocarburizing environment.

The nitrocarburizing environment may include any of the environments used in the Nitrotec process from pure ammonia to a mixture of ammonia or ammonia/nitrogen and an exothermic gas such as $CO$, $CO_2$, or $CH_4$.

In a specific embodiment of the invention, the balls are removed from the nitrocarburizing environment after an initial epsilon iron nitride layer has formed, cooled, re-oriented, and then returned to the nitrocarburizing environment at least once during the nitrocarburization cycle. The interim cooling step may be effected by a controlled cool in the presence of a non-oxidizing atmosphere, which for example is comprised of ammonia and nitrogen, or by quenching followed by a washing and drying step. Balls that are subjected to this interim cooling step, reoriented, and then returned to the nitrocarburizing environment are characterized by a larger epsilon iron nitride porous region than in the conventional Nitrotec treatment, which results in increased corrosion resistance and oil retention properties. Balls treated under this embodiment of the claimed process were found to survive not less than 96 hours of salt fog testing, with some samples surviving for over 3000 hours. Balls that have been treated in accordance with the claimed invention are well suited for applications requiring a hardened surface and a finite limit of corrosion protection, which until now have employed more expensive stainless steels of the 300 and 400 series. These balls also are well suited for tribological applications requiring oil retention.

DESCRIPTION OF THE PREFERRED EMBODIMENT

Figure 1:
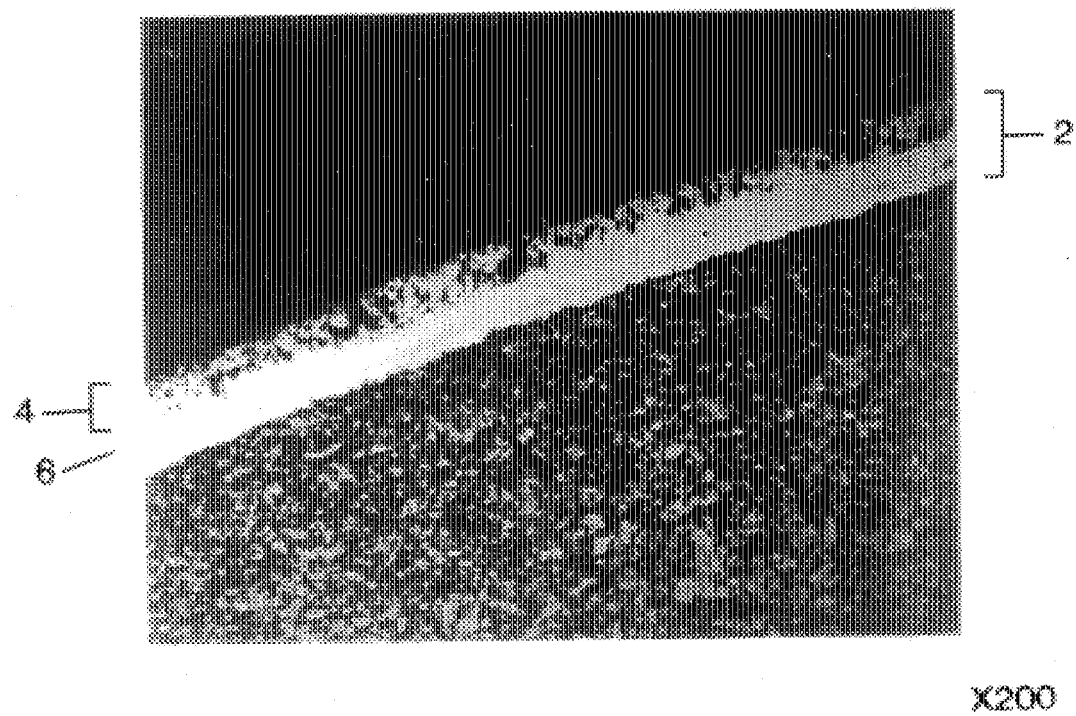
FIG. 1 is a photomicrograph taken at a magnification of 200× of a non-carburized (soft) steel ball that has been processed in accordance with the claimed invention.

In one form, the invention claimed herein may be carried out by cold forming non-carburized (soft) low carbon steel balls, which are then soft-ground to remove flash and flats. Next, the balls are annealed and quenched to control grain size and structure. The balls are then trued and made to uniform size via a finish grind, and then polished in an octagonal tumbler first with silicon carbide grit for a rough polish, and then with a lime and water slurry for a fine polish. The polished balls are then washed with mild soap and water, and dried.

Next, the balls are placed at a depth of one layer on a series of stackable, high nickel content racks with mesh screens, said racks and mesh screens comprising for example the Haynes HR-120 heat resistant alloy. The number and size of the racks is limited only by the size of the heat zone in the furnace into which the balls will be placed. Further, the mesh screen size must be small enough to prevent the balls from falling through the mesh.

The racks are then placed in a standard Nitrotec-type nitrocarburizing environment and processed for one half of the normal cycle time to form an initial epsilon iron nitride ($Fe_3N$) layer. This initial epsilon iron nitride layer is of non uniform thickness and characterized by bare spots where balls were in intimate contact with each other.

The balls are then removed from the nitrocarburizing environment and allowed to cool over an oil bath in a non-oxidizing atmosphere, which for example is comprised of a combination of ammonia and nitrogen. Alternatively, the balls may be quenched in oil or water and then washed and dried. Next, the balls are reoriented, for example by shaking the rack or by removing the balls from the rack into a holding container, and then replacing the balls on the rack in a new orientation. The reoriented balls are then returned to the furnace, and subjected to the nitrocarburization environment for the remainder of the standard Nitrotec cycle. By reorienting the balls during the nitrocarburization step of the process, prolonged intimate contact between any two balls is prevented, thereby allowing the epsilon iron nitride ($Fe_3N$) outer layer to form over the entire surface of the ball.

After this nitrocarburization cycle is complete, the balls are exposed to a controlled air atmosphere to form a black iron oxide ($Fe_3O_4$) layer. Next the balls are quenched in oil or water such that nitrogen is retained in solid solution in the iron matrix of the steel microstructure. The balls are then buffed using cob meal. Finished balls are characterized by a black, corrosion resistant iron oxide ($Fe_3O_4$) surface layer. Beneath this layer is an epsilon iron nitride ($Fe_3N$) outer layer having some thickness over the entire surface of the ball, comprised of two distinct sections. The section closest to the surface of the ball is an oxygen rich micro-porous region, which provides good corrosion resistance and oil retention characteristics. The other section is a solid, nitrogen rich layer, which enhances the tensile and fatigue strength of the ball.

Referring now to FIG. 1, it will be seen that a ball processed in accordance with the claimed invention is characterized by an epsilon iron nitride outer layer ($Fe_3N$) 2 having two distinct sections, with the section closest to the surface of the ball comprised of a porous section 4 and the other section comprised of a solid solution of nitrogen in an iron matrix of the steel microstructure 6.

Figure 2:
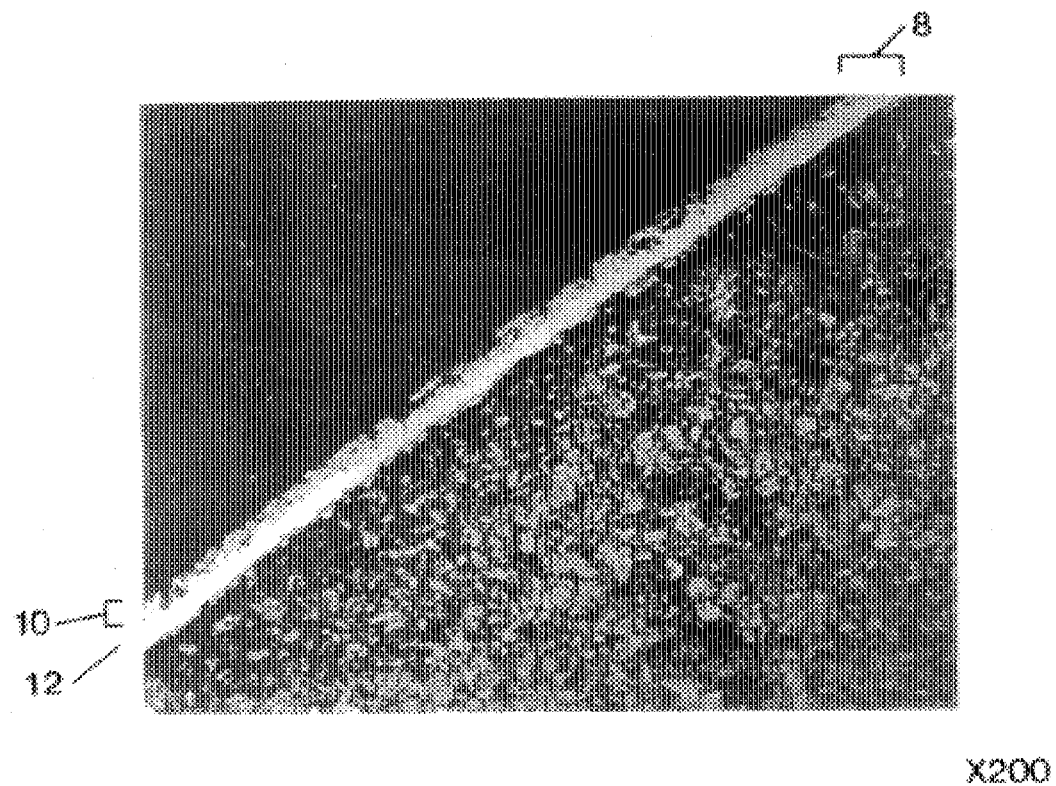
FIG. 2 is a photomicrograph taken at a magnification of 200× of a non-carburized (soft) steel ball processed under standard Nitrotec conditions.

FIG. 2 shows the epsilon iron nitride layer 8 of a ball processed under the standard Nitrotec method. The epsilon iron nitride outer layer 8 is comprised of a porous section 10 and a solid solution section 12. It will be appreciated, however, that the porous section 10 is significantly smaller than the corresponding section 4 of FIG. 1.

Table 1 compares salt fog test results for polished balls processed in accordance with the claimed invention to polished balls treated under the standard Nitrotec process. Tests were conducted on ⅜ inch non-carburized low carbon steel balls, which had first been polished. Each salt fog test run consisted of at least 10 samples. The salt fog tests were run in accordance with ATSM Standard B117-85 in which the balls are exposed in a salt fog chamber maintained at 93° to 97° F., to a salt fog comprising 3.9 to 6.0 weight percent NaCl salt and a pH range of 6.7 to 7.2. Balls that survived for 96 hours or more without forming red rust were deemed to have passed.

TABLE 1

| TEST | HOURS TO FAILURE/RESULTS |
| --- | --- |
| 1. Balls processed in accordance with the present invention | All balls survive for a minimum of 96+ hours without forming red rust, with no ball surviving for less than 100 hours, and some balls still in test after over 3000 hours. |
| 2. Balls processed under standard Nitrotec process | Balls begin failing after 4 hours. |
| 3. Balls processed under standard Nitrotec process, special racking procedure employed to minimize intimate contacts between the balls | 25% of the balls fail to survive for the minimum of 96 hours. Failures begin after 4 to 72 hours. |

As can be seen in Table 1, all of the balls treated in accordance with the present invention survived salt fog testing for over 96 hours without forming red rust. Inspection of these balls under fluorescent lamps after the surface grit had been washed off, revealed no bare spots or evidence of solid state diffusion. It will also be appreciated from Table 1 that balls treated in accordance with the standard Nitrotec process are characterized by poor corrosion resistance, with balls beginning to fail after only four (4) hours. Inspection of the failed balls under fluorescent lamps after removing the surface grit revealed bare spots, which are believed to account for the balls' poor corrosion resistance characteristics. It is thought that intimate contacts between the balls, which cause superficial metal flow at the surface of the contacting balls, were primarily responsible for these bare spots. However, even when a special racking procedure was employed to support the balls during the standard Nitrotec process whereby these intimate contacts between the balls were minimized by placing a ¼ inch spaced mesh screen on top of the balls to hold the balls substantially separate from each other, 25-percent of the balls still failed in salt fog testing, thus suggesting that some intimate contact and the associated superficial metal flow had occurred between some balls in spite of the steps which had been taken to minimize such contact. The difficulty of keeping balls separate when multiple balls are processed, underscores the usefulness of the claimed process, which can be effectively used to treat one or more balls, even if the balls are in intimate contact. Those skilled in the art will recognize that the invention claimed herein, which is defined by the scope of the claims set forth below, is not limited to the above disclosed preferred embodiment. Thus, it will be readily apparent to those skilled in the art that additional modifications and alternative embodiments may be developed without departing from the teachings and spirit of the claimed invention.

What is claimed is:

1. A heat treatment process for producing a corrosion resistant steel ball comprising the steps of:
   (a) placing the steel ball in a first orientation;
   (b) nitrocarburizing the steel ball to form an epsilon iron nitride ($Fe_3N$) outer layer comprised of two distinct sections, with the section closest to the surface of the ball comprised of a porous region, and the other section comprised of a solid solution of nitrogen in an iron matrix of the steel microstructure;

(c) reorienting said ball during said nitrocarburizing step to cause said epsilon iron nitride outer layer to have some thickness over the entire surface of the ball so that there are no bare spots within said layer, and to provide at least some increase in corrosion resistance;

(d) placing the ball in an oxidizing atmosphere to form an iron oxide ($Fe_3O_4$) surface layer; and (e) cooling the ball such that nitrogen is retained in solid solution in the iron matrix of the steel microstructure.

2. A process as set forth in claim 1, wherein the ball is reoriented inside the nitrocarburizing environment to form the epsilon iron nitride outer layer having some thickness over the entire surface of the ball.

3. A process as set forth in claim 2, wherein the ball is continuously reoriented inside the nitrocarburizing environment to form the epsilon iron nitride outer layer having some thickness over the entire surface of the ball.

4. A process as set forth in claim 1, wherein the ball is removed from the nitrocarburizing environment after an initial epsilon iron nitride layer has formed, reoriented, and returned to the nitrocarburizing environment to form the epsilon iron nitride outer layer having some thickness over the entire surface of the ball.

5. A process as set forth in claim 4, wherein the ball is removed from the nitrocarburizing environment, cooled in a non-oxidizing environment, reoriented, and returned to the nitrocarburizing environment to form the epsilon iron nitride layer having some thickness over the entire surface of the ball.

6. A process as set forth in claim 4, wherein the ball is periodically removed from the nitrocarburizing environment, reoriented, and returned to the nitrocarburizing environment to form the epsilon iron nitride layer having some thickness over the entire surface of the ball.

7. A process as set forth in claim 4, wherein a rack is employed to support the ball in the nitrocarburizing environment.

8. A process as set forth in claim 7, wherein a single layer of balls are supported by the rack.

9. A process as set forth in claim 1, wherein the ball is polished before being placed in the nitrocarburizing environment.

10. The product made by the process as claimed in claim 1.

11. A corrosion resistant steel ball having an iron oxide surface layer and an epsilon iron nitride outer layer comprised of two distinct sections, with the section closest to the surface of the ball comprised of a porous region, and the other section comprised of a solid solution of nitrogen in an iron matrix of the steel microstructure, said epsilon iron nitride outer layer having some thickness over the entire surface of the ball so that there are no bare spots within said layer.

12. The steel ball of claim 11 wherein the porous section of the epsilon iron nitride layer is of an enhanced thickness relative to the corresponding sections of steel balls processed under a conventional nitrocarburization process.

* * * * *